(12) United States Patent
Olbrich et al.

(10) Patent No.: US 11,919,783 B2
(45) Date of Patent: Mar. 5, 2024

(54) BETA-NICKEL HYDROXIDE DOPED WITH ALUMINUM

(71) Applicant: Umicore, Brussels (BE)

(72) Inventors: Armin Olbrich, Seesen (DE); Juliane Meese-Marktscheffel, Goslar (DE); Petra Scholz, Bad Harzburg (DE); Mirja Sternberg, Sarstedt (DE); Matthias Jahn, Goslar (DE); Rüdiger Zertani, Goslar (DE); Dirk Paulmann, Bad Harzburg (DE); Henrik Trümpelmann, Darlingerode (DE)

(73) Assignee: Umicore, Brussels (BE)

( * ) Notice: Subject to any disclaimer, the term of this patent is extended or adjusted under 35 U.S.C. 154(b) by 211 days.

(21) Appl. No.: 16/621,008

(22) PCT Filed: Jun. 13, 2018

(86) PCT No.: PCT/EP2018/065607
§ 371 (c)(1),
(2) Date: Dec. 10, 2019

(87) PCT Pub. No.: WO2018/234112
PCT Pub. Date: Dec. 27, 2018

(65) Prior Publication Data
US 2020/0198986 A1 Jun. 25, 2020

(30) Foreign Application Priority Data
Jun. 23, 2017 (EP) .................... 17177612

(51) Int. Cl.
C01G 53/04 (2006.01)
C01D 15/02 (2006.01)

(52) U.S. Cl.
CPC ............. C01G 53/04 (2013.01); C01D 15/02 (2013.01); C01P 2002/54 (2013.01);
(Continued)

(58) Field of Classification Search
CPC ........ C01G 53/04; C01G 53/42; C01D 15/02; C01P 2002/54; C01P 2002/60;
(Continued)

(56) References Cited

U.S. PATENT DOCUMENTS 5,670,271 A    9/1997  Axmann
6,162,530 A *  12/2000 Xiao ........................ C01G 1/02
                                                            428/292.1

(Continued)

FOREIGN PATENT DOCUMENTS

CN    1724391 A    1/2006
CN  101285197 A   10/2008
(Continued)

OTHER PUBLICATIONS

Chen, Xu, et al. "Al and Co co-doped α-Ni (OH) 2/graphene hybrid materials with high electrochemical performances for supercapacitors." Electrochimica Acta 137 (2014): 352-358.*

(Continued)

Primary Examiner — Richard M Rump
(74) Attorney, Agent, or Firm — NK Patent Law

(57) ABSTRACT

The present invention relates to β-nickel hydroxide doped with aluminum ions, in which the aluminum ions are homogeneously distributed in the crystal lattice of the β-nickel hydroxide, as well as a method for their production. The present invention further relates to the use of the β-nickel hydroxide according to the invention as a precursor material for the production of electrode material for lithium-ion batteries and nickel-metal hydride batteries and as a precursor material in the production of Raney nickel catalysts.

12 Claims, 3 Drawing Sheets

(52) U.S. Cl.
CPC ...... *C01P 2002/60* (2013.01); *C01P 2002/72* (2013.01); *C01P 2004/32* (2013.01); *C01P 2004/50* (2013.01); *C01P 2006/11* (2013.01)

(58) Field of Classification Search
CPC .............. C01P 2004/32; C01P 2004/50; C01P 2006/11; C01P 2002/72; Y02E 60/10; H01M 4/525; B22F 9/20
See application file for complete search history.

(56) References Cited

U.S. PATENT DOCUMENTS

| 2004/0265217 | A1 | 12/2004 | Olbrich et al. | |
|---|---|---|---|---|
| 2006/0089257 | A1* | 4/2006 | Albrecht | C01G 53/006 502/335 |
| 2011/0300470 | A1 | 12/2011 | Olbrich et al. | |
| 2017/0309911 | A1* | 10/2017 | Ryoshi | C01G 53/04 |
| 2017/0358798 | A1 | 12/2017 | Kageura et al. | |

FOREIGN PATENT DOCUMENTS

| CN | 102509787 | A | 6/2012 |
|---|---|---|---|
| CN | 103288145 | A | 9/2013 |
| EP | 0712174 | A2 | 5/1996 |
| JP | 2008037749 | A | 2/2008 |
| JP | 2016088776 | A | 5/2016 |
| WO | 2012/095381 | A2 | 7/2012 |
| WO | 2016104488 | A1 | 6/2016 |

OTHER PUBLICATIONS

Yue, Xihong, et al. "Synthesis and electrochemical properties of nano-micro spherical β-Ni (OH) 2 with super high charge-discharge speed." Industrial & engineering chemistry research 51.25 (2012): 8358-8365.*
JPO; Office Action for Japanese Patent Application No. 2019-570962 dated Dec. 21, 2020, 3 pages.
ISA/EP; International Search Report and Written Opinion for International Patent Application No. PCT/EP2018/065607 dated Jul. 13, 2018, 8 pages.

* cited by examiner

30μm

600µm  300µm  150µm  80µm

30µm

600µm  300µm  150µm  80µm

BETA-NICKEL HYDROXIDE DOPED WITH ALUMINUM

CROSS-REFERENCE TO RELATED APPLICATIONS

This application is a U.S. National Stage application of International Patent Application No. PCT/EP2018/065607, filed on Jun. 13, 2018, which claims the benefit of European Patent Application No. 17177612.3, filed on Jun. 23, 2017.

TECHNICAL FIELD AND BACKGROUND

The present invention relates to β-nickel hydroxide doped with aluminum ions, in which the aluminum ions are homogeneously distributed in the crystal lattice of the β-nickel hydroxide, as well as a method for their production. In particular, the nickel hydroxide according to the invention is characterized by a spherical morphology of particles composed of fine crystallites, whereby high packing densities can be attained. The present invention further relates to the use of the β-nickel hydroxide as a precursor material for the production of cathode material for lithium-ion batteries and the direct use as cathode material in nickel-metal hydride batteries.

Nickel hydroxide and methods for its production have come ever more to the attention of industry in recent years, in particular in the context of the constantly increasing demands that are placed on batteries. Nickel hydroxides in a wide variety of forms with regard to physical properties and composition modification via doping with foreign metals have been used for decades as cathode materials in different (rechargeable) secondary batteries (also called accumulators).

The following partial reactions take place at the cathode ("cathode" concerns the discharging process): $Ni(OH)_2 + OH^- \rightarrow NiOOH + H_2O + e^-$ (charging or the back reaction during discharge). The electrons stripped away during the charging process are supplied via the external circuit to an appropriate electron acceptor, which is thus reduced during the charging process and reoxidized during the discharging.

The counter electrode of the nickel-cadmium accumulator is an example here, because this secondary battery type has played an important role for many decades in use for small devices but also, for example, as an emergency power supply in airplanes. The reaction at the counter electrode runs as follows:

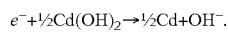

$e^- + \tfrac{1}{2}Cd(OH)_2 \rightarrow \tfrac{1}{2}Cd + OH^-$.

In this direct use, one consciously differentiates between the so-called regular (in the sense of ordinary) nickel hydroxides that are distinguished by a broad particle size distribution of agglomerates of fine primary particles and that stand out optically in the microscope because of their sharp, irregular shape, which has the result that only relatively low packing densities (generally <1.5 g/cm³) can be achieved, and, by contrast, approximately spherical agglomerates of fine primary particles that can then have significantly higher packing densities of >1.8 g/cm³ or even >2.0 g/cm³. It is clear that these low packing densities of regular nickel hydroxides are disadvantageous for use as a battery material because the objective for this type of application is to accommodate as much storage material as possible in a given battery volume.

During the eighties of the last century, a so-called spherical nickel hydroxide was developed as part of or caused by the development of Cd-free anode materials, which are distinguished by an essentially spherical particle form of the nickel hydroxide. The Cd-free anodes are typically composed of hydrogen storage alloys of the type AB2 or AB5 and are obtainable in spherical particle form via atomization processes. In this manner, a high packing density can be achieved on the anode side of the battery (again relative to the discharge process). Correspondingly, much electric energy can thus be stored in a specified battery volume. Being able to use this advantage consistently motivated the development of the spherical nickel hydroxide for the counter electrode.

While the aforementioned ordinary type of nickel hydroxide was usually only doped with cobalt, over the years, a whole series of patent documents and scientific publications has appeared that describe a positive influence on the electrochemical properties through additional doping metals, which also occur in a trivalent valence state.

It is known to the person skilled in the art that spherical nickel hydroxides can only be achieved by precipitation crystallization under conditions in which the precipitation is carried out in a controlled manner, which can be achieved by increasing the solubility of the nickel hydroxide, which has a very low solubility product. This usually takes place via addition of liquid ammonia, which, because of the very high tendency toward complex formation with nickel, shows the desired effect by formation of soluble nickel ammine complexes. The tendency toward complex formation of liquid ammonia with nickel is in particular significantly lower for the most important doping elements of spherical nickel hydroxide, Co and Zn, but is still sufficient to allow a controlled precipitation within specific pH regions. The attempt to construct trivalent $Al^{3+}$ cations in the nickel hydroxide via co-precipitation usually leads to a separate precipitation of very fine aluminum hydroxide particles that, for one thing, negatively influence the whole, controlled precipitation crystallization as undesired seeds and, for another, do not permit homogeneous distribution of the aluminum in the nickel hydroxide. This interference can be ascribed to, among other things, the fact that aluminum hydroxide has a significantly smaller solubility and that the $Al^{3+}$ ions do not have any tendency whatsoever toward complex formation with ammonia. Assuming that an Al doping has a positive effect on nickel hydroxide in nickel-metal hydride batteries (assuming sufficient sphericity and packing density), there is, therefore, the need for an alternative synthesis method to the conventional incorporation of aluminum in the form of aluminum sulfate solutions or solutions of other simple aluminum salts in the precipitation process.

A stabilizing effect on the crystal lattice, among other things, is ascribed to the doping of nickel (II) hydroxide with cobalt. It is generally assumed that this stabilizing effect arises as a result of $Co^{3+}$ ions being produced in the so-called forming cycles during charging of the battery via oxidation of $Co^{2+}$ ions and, unlike the $Ni^{3+}$ ions, being reversibly reduced during the discharge. It would now be possible for $Al^{3+}$ ions to take on the role of the cobalt. This would result in an enormous economic advantage because cobalt is a very expensive material that could now be at least partially substituted by the very inexpensive aluminum.

The use of nickel hydroxide as cathode material in batteries has been known for a long time. For example, as already indicated, nickel-metal hydride accumulators having a positive electrode made of nickel (II) hydroxide and a negative electrode made of a hydrogen storage alloy (for example, type AB2 or type AB5) have found broad application. The following equations show the charging reaction; during discharge, the reverse process takes place.

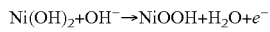

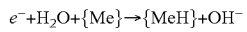

In order to attain the maximum possible use of this one-electron step in the nickel hydroxide electrode, not only must the electrons be dischargeable in an unhindered manner, but protons as well must migrate, during charging, from the interior of the nickel hydroxide to the surface of the active material, where they are picked up by the basic electrolytes of the battery. During discharge, the reverse process must then be able to run unhindered.

It was realized early on that the physical and electrochemical properties of the accumulators can be improved if the nickel (II) hydroxide is doped with foreign ions such as aluminum or cobalt. This resulted in the challenge of providing a doped nickel (II) hydroxide, in which the positive properties of the undoped nickel (II) hydroxide (such as its high sphericity and packing density) are retained despite the presence of the foreign ions. Particularly when using a high proportion of foreign ions, the problem arises that the structure of the crystal lattice of the nickel (II) hydroxide changes from β-type to α-type, which is unsuitable for use in accumulators because of its low density.

Rechargeable batteries based on nickel use the reversible redox process between nickel (II) hydroxide and nickel (III) oxyhydroxide. The nickel (III) oxyhydroxide is reduced to nickel (II) hydroxide during discharge through the uptake of one proton from the surrounding electrolyte and of one electron from the collector electrode that is in contact with the active material that was previously oxidized to oxyhydroxide during the charging process. This classic one-electron step (reversible oxidation of $Ni^{2+}$ to $Ni^{3+}$) is overlaid by a partial formation of γ-phases (partial oxidation to $Ni^{4+}$) fostered by the defect structure, which negatively impacts the charging capacity of the accumulator.

In this context, the proton conductivity of the material used has in particular come into focus as a possible adjusting screw for the optimization of the discharging characteristic of nickel-metal hydride batteries. The proton conductivity is facilitated by the plurality of grain boundaries and defects because of the material structure from fine crystallites as well as through a pore structure into which the electrolyte can penetrate. The proton conductivity specifies the initial charge/discharge capacity of the accumulator, which, in turn, is determined by, among other things, the size of the primary crystals that make up the structure of the nickel hydroxide material. The smaller the primary crystallite size, the higher the initial charge/discharge capacity. An equivalent is found, for example, in an article by Gille et. al. "Cathode materials for rechargeable batteries—preparation, structure—property relationships and performance" in Solid State Ionics, Vol 148; pages 269-282.

WO2012/095381 relates to a method for producing transitional metal hydroxides having an average diameter in a range from 6 to 12 μm (D50), characterized in that one combines at least one solution of at least one transition metal salt with at least one solution of at least one alkali-metal hydroxide in a mixing vessel and thus produces an aqueous suspension of transition metal hydroxide, and that, in at least one additional compartment, one continuously introduces into each portion of the suspension a mechanical power in the range of from 50 to 10000 W/l, relative to the proportion of the suspension, and afterward returns the portion into the mixing vessel.

WO2016/104488 discloses a positive electrode active material for a lithium secondary battery, including secondary particles formed by aggregation of primary particles and having the formula: $Li[Li_x(Ni_aCo_bMn_cM_d)_{1-x}]O_2$, wherein $0 \leq x \leq 0.1$, $0.7 < a < 1$, $0 < b < 0.2$, $0 \leq c < 0.2$, $0 < d < 0.1$, $a+b+c+d=1$, and M is a dopant being preferably Al; and having a crystallite size α/crystallite size β ratio (α/β) of 1.60 to 2.40, wherein the crystallite size α is within a peak region of 2θ=18.7±1° and the crystallite size β is within a peak region of 2θ=44.4±1°, each determined by a powder X-ray diffraction measurement using Cu-Kα radiation. The crystallites have been anisotropically grown (not spherical), and have a crystallite size α between 400 and 1,200 Å, and β between 200 and 600 Å.

It is an object of the present invention to provide an improved β-nickel (II) hydroxide powder that is appropriate for use as a precursor material for the production of lithium-nickel aluminum oxides that are used as active material in lithium-ion batteries. These are characterized by a high sphericity as well as a high charge and discharge capacity. Another use is in the production of a Raney nickel catalysts for hydrogenation processes.

SUMMARY AND DETAILED DESCRIPTION

Surprisingly, it was found that the object of the present invention was achieved by the provision of a β-nickel (II) hydroxide that has a uniform doping with aluminum ions (Al ions) and that is formed from spherically agglomerated primary crystallites having a crystallite size of 100 Å or less, determined via X-ray diffraction, and wherein the secondary particles have a particle size between 2 and 20 μm. The β-nickel (II) hydroxide may also be doped with Co ions, in which case it may be called a nickel/cobalt hydroxide. Correspondingly, a first subject of the present invention is a β-nickel (II) hydroxide doped with Al ions (and optionally with Co ions), characterized in that the Al ions are homogeneously distributed in the crystal lattice of the β-nickel (II) hydroxide and the β-nickel (II) hydroxide includes spherically agglomerated primary crystallites having a crystal size of 100 Å of less. The crystallite size of the primary crystallites is determined from the line profile analysis of the 101 reflex (38.5° 2Θ) of the X-ray diffraction with Cu $K_α$ radiation (λ=1.5406 Å) according to the single line method. According to the invention, the Al ions are homogeneously distributed in the crystal lattice of the β-nickel (II) hydroxide. A homogeneous distribution in the context of the invention is understood to mean that the composition of the individual particles differs from the average value of the samples by no more than 15 mol %, preferably no more than 10 mol %, particularly preferably by no more than 5 mol %, relative to the content of Al ions. Homogeneous in the context of the invention is furthermore understood as an atomically disperse distribution, which is expressed in that only the phase of the β-nickel (II) hydroxide and no separate phases are observed in the X-ray diffraction. In a particularly preferred embodiment of the powder according to the invention, no domain formation could be determined such as can be determined via electron probe X-ray microanalysis EPMA.

Advantageously, the primary crystallites have a crystallite size of less than 70 Å, particularly preferably less than 50 Å, specifically less than 30 Å. It has been shown that primary crystallites having a crystallite size in the claimed range can be unified into spherically agglomerated particles having a high sphericity, which in turn leads to the resulting powder having a good packing density. In a preferred embodiment, the β-nickel (II) hydroxide particles that are formed from the primary crystallites are spherical. In the context of the present invention, spherical is understood as particles that are essentially ball-shaped, wherein such not strictly ball-shaped particles are also subsumed, in which the largest semi-axis and the shortest semi-axis differ by 10% at the most. In addition, the entirety of the particles of a sample are understood to be "essentially ball-shaped" if, in a representative sample, at least 95% by weight of the particles have an essentially ball-shaped form. The form of the particles can, for example, be determined using light microscopy (LM) or scanning electron microscopy (SEM).

In a preferred embodiment, the form factor of the β-nickel (II) hydroxide particle is 0.8 or more, preferably 0.9 or more and particularly preferably 0.95 or more. The form factor is determined by the evaluation of the particle circumference U, of the particle surface A and of the determination of the diameter derived from the respective size. The diameters referenced result from $$d_U = U/\pi \quad d_A = (4A/\pi)^{1/2}$$

The form factor of the particle f is derived from the particle circumference U and the particle surface A according to the equation:

$$f = \left(\frac{d_A}{d_U}\right)^2 = \left(\frac{4\pi A}{U^2}\right)$$

In the case of an ideal spherical particle, $d_A$ and $d_U$ are equally large and a form factor of one would result. The form factor can generally be determined using SEM images of the materials. In an additional preferred embodiment, the form factor of the primary crystallite is 0.8 or more, preferably 0.9 or more and particularly preferably 0.95 or more.

The β-nickel (II) hydroxide according to the invention comprises a doping with Al ions. In a preferred embodiment, the content of Al ions in the β-nickel (II) hydroxide is 1.5 to 10 mol %, preferably 2 to 7 mol % and particularly preferably 3 to 5 mol %. The Co content may be between 5 and 20 mol %, preferably between 10 and 20 mol %. An additional characteristic of nickel hydroxides for the production of accumulators is the tap density. It depends on, among other things, the grain distribution and increases in particular with increasing sphericity, which can be characterized by the aforementioned form factor, for example. The β-nickel (II) hydroxide according to the invention preferably has a tap density of at least 1.8 g/cm³, preferably at least 2.0 g/cm³ and particularly preferably at least 2.1 g/cm³ determined according to ASTM B 527. Using a tap density in the claimed range, accumulators can be produced that are distinguished by a high volume-specific capacitance $C_v$, wherein the volume-specific capacitance is formed from the product of the mass-specific capacitance $C_m$ and the tap density.

An additional important parameter that specifies the capacitance of an accumulator is the specific surface of the material used. In a preferred embodiment, the β-nickel (II) hydroxide according to the invention has a specific surface of from 5 to 25 m²/g, preferably 6 to 20 m²/g, particularly preferably 7 to 15 m²/g, determined according to the Braun-Emmet-Teller (BET) method. The actual specific surface is chosen according to the desired application. By means of a BET surface in the claimed region, a large boundary surface can be formed between the electrolytes and the active material. Additionally, a BET surface in the region according to the invention makes the β-nickel (II) hydroxide especially appropriate for the production of lithium nickel cobalt aluminum oxide (LNCAO). Without being tied to a specific theory, it is assumed that the diffusion of the lithium in the particles is facilitated because of the specified BET surface.

The β-nickel (II) hydroxide according to the invention is distinguished by being constructed of spherically agglomerated primary crystallites that assemble into secondary particles. The secondary particles preferably have a particle size in the range of from 2 to 20 μm, determined in accordance with ASTM B822. Particularly preferably, the D50 value of the particle size distribution is 3 to 14 μm, preferably 4 to 10 μm and particularly preferably 4.5 to 7 μm, determined by laser diffraction using a Master Sizer device.

In order to further improve the physical and electrochemical properties of the β-nickel (II) hydroxide according to the invention and to adapt to individual requirements, the β-nickel (II) hydroxide can have additional doping substances in addition to Al ions. These additional doping substances are preferably present in the β-nickel (II) hydroxide in the form of ions. Particularly preferably, these are ions of Cr, V, Mn, Fe, Co, Zn, Ti, Mg, Zr and/or mixtures thereof. Particularly preferred are ions of Co, Zn and Mn. The concentration of the additional doping substances in the β-nickel (II) hydroxide is 0.1 to 30 mol %, preferably 5 to 20 mol % and particularly preferably 10 to 20 mol %, relative to the total weight of the powder.

As already indicated, there is the need for a method, in which a homogeneous distribution of the Al ions in the crystal lattice of the β-nickel (II) hydroxide is achieved.

Surprisingly, it was found that the Al ions are homogeneously incorporated into the crystal lattice if the aluminum is added to the reaction not as a cationic salt, such as aluminum sulfate, but in the form of an aluminate.

Therefore, an additional subject of the present invention is a method for producing the β-nickel (II) hydroxide according to the invention via precipitation, characterized in that an aluminate is used as the Al ion source.

In the context of the invention, aluminates are understood to be salts, in which aluminum forms a complex anion [Al(OH)$_4^-$] having hydroxide ions as ligands. The aluminate is preferably sodium tetrahydroxyaluminate (NaAl(OH)$_4$).

In a preferred embodiment, the method for producing spherical nickel hydroxide homogeneously doped with Al ions according to the invention includes the following steps:
a) preparation of a solution formed from Na$_2$SO$_4$, NaOH and NH$_3$ in the presence of water
b) addition of an aluminate and a nickel compound to the mixture from step a) with the formation of a β-nickel (II) hydroxide doped with Al ions
c) separation of the obtained (doped) β-nickel (II) hydroxide.

In a particularly preferred embodiment, the aluminate is added in the form of a basic solution, for example dissolved in sodium hydroxide. In another preferred embodiment, in step b) the nickel compound is a nickel/cobalt sulfate solution whereby in step c) a β-nickel (II) hydroxide is obtained doped with Co and Al ions.

The method is preferably performed in a stirred reactor, wherein it is preferably processed in continuous operation mode. In a particularly preferred embodiment, the method is carried out in a stirred reactor having an integrated baffle plate thickener, through which mother liquor can be continuously drawn off during the continuous operation in order to thereby increase the solids concentration in the particle suspension. Such a reactor is further detailed in US2011/0300470. The increased solids concentration effects a very strong increase in particle collisions and abrasion of particles against one another, whereby the fragments become rounder and the packing density of the nickel hydroxide powder can be correspondingly increased. It is assumed from experience that, with solids contents of 400 g/L or higher, the nickel or nickel/cobalt hydroxide homogeneously doped with Al having a tap density of 2.2 g/cm³ or even 2.4 g/cm³ according to the invention can be obtained.

In the method according to the invention, sulfate ions can be present in the product because of the process, because they are generally present in a higher concentration in the mother liquor. Depending upon the application of the powder, it can be advantageous to limit the content of sulfate ions in the powder. In one preferred embodiment, the method according to the invention therefore includes an additional step, i.e. an additional conditioning step with sodium hydroxide for minimizing the sulfate content of the obtained β-nickel (II) hydroxide without changing the characteristics of the obtained hydroxide, such as PSD, tap density, BET surface area, half-width 101 reflex FWHM and crystallite size. This can be accomplished by, for example, warming the product in a basic environment, such as a sodium hydroxide solution, wherein the temperature can be 65° C. or 85° C., for example.

A further subject of the present invention is a β-nickel (II) hydroxide doped with Al ions that can be obtained via the method according to the invention.

The β-nickel (II) hydroxide obtainable via the method according to the invention is distinguished after the primary precipitation by a sulfate content in the range from 9000 to 15000 ppm, preferably 10000 to 12000 ppm, each relative to the total weight of the powder.

Depending upon the type of application, it may be desirable to reduce the sulfate content. This can be achieved by a conditioning with sodium hydroxide, for example, whereby the sulfate content can be reduced to <5000 ppm, which corresponds to the usual values of spherical nickel hydroxides that are directly used as active material in nickel-metal hydride batteries or alternatively, depending upon the doping or admixture, used as a precursor material for Li-ion batteries.

An additional subject of the present invention is the use of the β-nickel (II) hydroxide homogeneously doped with Al ions according to the invention as a precursor material for the production of lithium-nickel aluminum oxides or lithium-nickel cobalt aluminum oxides that are used as active material in lithium-ion batteries.

Lithium-ion accumulators describe a group of accumulators, in which lithium ions are contained in the negative and the positive electrode, as well as in the electrolyte. Lithium-ion accumulators are distinguished by their high specific energy.

Surprisingly, it was found that the β-nickel (II) hydroxide according to the invention is especially appropriate for the production of lithium nickel cobalt aluminum oxide (LNCAO), which, in turn, is used as a cathode material for lithium-ion accumulators. Conventional LNCAO powders often have the disadvantage that not all of the aluminum to be doped is found in the spherical particles. This can be determined by the detection of significant quantities of leached Al-containing ions after a 3-minute suspension of the LNCAO powder in water (up to 30% of the formal doping). Surprisingly, it was found that, when using the β-nickel (II) hydroxide according to the invention, such leaching is not observed. Without being tied to a specific theory, it is assumed that the homogeneous construction of the Al ions in the crystal lattice of the β-nickel (II) hydroxide hinders such "leaching" of the aluminum species.

The synthesis of this composite oxide generally succeeds if spherical nickel hydroxide or nickel/cobalt hydroxide is first intensively mechanically mixed with aluminum hydroxide and either lithium hydroxide or lithium hydroxide hydrate, to then undergo a thermal treatment. While the lithium ions diffuse into the composite oxide phase that is being formed without problems, this process is significantly more difficult for the essentially immobile aluminum ions. As a result, this thermal processing must be carried out in two steps or in one, albeit, very long step. After a first oven run, for example, the cooled material must be deagglomerated and homogenized in order to neutralize small, localized variations in the compound in a second oven run. Even after this elaborate two-stage procedure, achieving a satisfactorily even distribution of the aluminum is sometimes not successful. Often, small amounts of separate aluminum oxide phases or lithium aluminate remain in the material, whereby the important uniform balancing of the lithium is not guaranteed, which can, in turn, have a negative effect on the battery performance. In addition to a direct measurement of the worse performance of such materials in electrochemical test cells, often only observable in a long-term test run, one can determine the presence of separate Al compounds because these are leached out when using water, and the dissolved aluminum portion can be determined via potentiometric titration with acid, in particular in a further development of the so-called Warder titration that was originally developed for simultaneous determination of carbonate and hydrogen carbonate. In those LNCAOs that are produced in the nickel/cobalt hydroxides homogeneously doped with Al ions, no leached-out aluminum is detected according to this method.

It should be mentioned here that CN102509787 discloses a microemulsion method that is typically used for the production of nano-sized materials. Here a spherical doped nanoscale $Ni(OH)_2$ of 10-50 nm is prepared for its use in a Ni—Cd or MH/Ni battery. However, no secondary particles can be formed with this method, making the nanoparticles useless for the preparation of LNCAO powder. Indeed, state of the art high Ni cathodes have a morphology which can be explained as relatively dense secondary particles comprised of small primary crystallites, and having as requirements: a high packing density and easy processing, and a relatively large surface area to allow a high solids content during the electrode slurry preparation, to reduce the area of reactive surface between electrolyte and cathode to guarantee the safety of charged batteries, and finally to reduce the soluble base content (LiOH and $Li_2CO_3$ present on the surface of the LNCAO powder after the lithiation step. A typical morphology are spherical dense secondary particles of about 2-20 µm size consisting of small crystallites.

Surprisingly, it was further found that in using the nickel hydroxide or nickel/cobalt hydroxide doped with Al ions according to the invention, a one-step oven process is sufficient, wherein, in addition, the time of the oven run can be significantly shortened. This results in significant economical advantages and energy savings, thereby protecting the environment.

Naturally, the aluminum, which is already uniformly distributed in the precursor material, is also homogeneously distributed in the LNCAO in each individual particle, independent of the particle size, whether large or small. In the classic method, it can often happen that larger particles deep down have not been sufficiently doped with aluminum, while small particles have absorbed too much.

Therefore, in a preferred embodiment, the β-nickel (II) hydroxide according to the invention is used as a precursor material for the production of cathode material based on lithium nickel cobalt aluminum oxide (LNCAO).

A further object of the present invention is a lithium nickel cobalt aluminum oxide obtainable by reacting the β-nickel (II) hydroxide according to the invention with lithium hydroxide. As already mentioned, the LNCAO according to the invention is distinguished by a low utilization rate of the aluminum species.

An additional subject of the present invention is a method for producing the lithium nickel cobalt aluminum oxide according to the invention, including the following steps:
a) production of the β-nickel (II) hydroxide doped with Al and Co ions according to the invention,
b) mixing of the β-nickel (II) hydroxide with lithium hydroxide, and
c) processing the mixture from step b) in an acidic atmosphere at a temperature between 700 and 850° C. to obtain lithium nickel cobalt aluminum oxide.

In a preferred embodiment, the duration of the processing is less than 16 hours, preferably less than 12 hours and particularly preferably less than 8 hours. Particularly preferably, the duration is 2 to 16 hours. This thermal processing, also called calcination, can be conducted in different appropriate ovens in batch or, preferably, in a continuous processing, wherein the particularly preferred assembly is a continuously operated roller hearth furnace with use of ceramic shuttles or trays.

Nickel-metal hydride accumulators (NiMH) have one positive electrode made from nickel (II) hydroxide and one negative electrode made from a metal hydride. Compared to nickel-cadmium accumulators, they are distinguished by the lack of toxic cadmium and a higher energy density. Therefore, an additional subject of the invention is the use of nickel (II) hydroxide according to the invention as a cathode material in nickel-metal hydride accumulators. The nickel hydroxides according to the invention are surprisingly distinguished by very small crystallite sizes and, therefore, should lead to high mass utilizations in nickel-metal hydride batteries. Because of the optimal mass utilization of the nickel (II) hydroxide, nickel-metal hydride accumulators comprising the β-nickel (II) hydroxide according to the invention, have an improved charging density and a longer operational life. An additional subject of the present invention is, therefore, a nickel-metal hydride accumulator comprising the β-nickel (II) hydroxide according to the invention.

For the nickel hydroxides according to the invention that were obtained using the method according to the invention, other application possibilities beyond the subject area of battery materials are also conceivable. Surprisingly, it was found that spherical nickel hydroxide can be reduced to metallic nickel under moderate temperatures in a hydrogen stream while retaining the spherical morphology, whereby large specific surfaces of >100 m²/g occur.

It is known that Raney nickel catalysts for hydrogenation processes classically are usually produced by smelting a Ni/Al alloy, pulverizing it and then leaching out the aluminum using sodium hydroxide. Experience has shown that certain residual amounts of aluminum are important for the catalytic activity; thus, a perfect leaching does not deliver the best results. With this in mind, the nickel hydroxide doped with Al ions can be reduced with hydrogen, wherein metallic nickel occurs and the base aluminum remains in the particles as aluminum hydroxide. The material thus prepared can, therefore, be used as a Raney catalyst. The aluminum can thus be completely kept in the particles or be leached out in a defined manner to the desired degree using acids.

A further subject is, therefore, the use of the β-nickel (II) hydroxide according to the invention for the production of Raney nickel.

The present invention is illustrated in reference to the following examples, wherein these are not to be understood as a limitation of the inventive concept.

Production of the β-Nickel (II) Hydroxide According to the Invention:

Example 1 (According to the Invention)

A 17 L stirred-tank reactor is first loaded with an aqueous solution formed from $Na_2SO_4$, NaOH and $NH_3$ in water (mother liquor), wherein the concentration of $Na_2SO_4$ was 130 g/L, of NaOH 5 g/L and of $NH_3$ 8 g/L in the mother liquor. Next, the solution is warmed to 45° C. and, while being stirred with a disk agitator at 780 rotations per minute (rpm), 658 g/h (0.55 L/h) sodium hydroxide liquor containing 199.2 g/L NaOH and 15.2 g/L $NaAl(OH)_4$, 948 g/h (0.772 L/h) nickel/cobalt sulfate solution containing 84.4 g/L Ni and 16 g/L Co, as well as 65 g/h (0.071 L/h) aqueous liquid ammonia solution containing 226 g/L $NH_3$ are continuously added to the reactor via gravimetric dosing systems. The resulting suspension having a solids content of 92 g/L is periodically and in a constant level-regulated manner pumped out of the homogeneously mixed zone of the reactor via an immersion lance. The average dwell time in the reactor was 12 hours. After 6 dwell times, the stationary state of the reactor was achieved. 5 L was collected from the discharging suspension, filtered off via a suction filter and the filter cake washed using 2 L of warm water. After drying at 80° C. in the drying oven, 436 g of the desired β-nickel (II) hydroxide doped with aluminum and cobalt ions are obtained. The product has the following properties:

Composition: 80 mol % Ni, 15 mol % Co, 5 mol % Al; Particle size distribution: D10: 2.6 μm; D50: 6.3 μm; D90: 10.5 μm; D100: 16.6 μm; Tap density: 1.97 g/cm³; BET surface: 22.1 m²/g; Half-width 101 reflex FWHM: 1.41° Θ; crystallite size 45 Å; Impurities: Na: 23 ppm; $SO_4$: 11400 ppm.

FIG. 1 shows an X-ray diffraction of the powder that is produced. Only the β-nickel (II) hydroxide phase is visible. Separate cobalt or aluminum phases do not occur.

Example 2 (According to the Invention)

Analogously to Example 1, the reactor is first loaded with the mother liquor, wherein the concentration of $Na_2SO_4$ is 130 g/L, that of NaOH is 4 g/L and that of $NH_3$ 8 g/L in the stationary state, and the solids content is 92 g/L. As described in Example 1, the additional components are added, only now the reactor is warmed up to 50° C. and the stirring speed is 880 rotations per minute (rpm). After the processing, which is accomplished analogously to Example 1, 464 g of the desired product is isolated. The product has the following properties:

Composition: 80 mol % Ni, 15 mol % Co, 5 mol % Al; Particle size distribution: D10: 3.5 μm; D50: 7.4 μm; D90: 12.3 μm; D100: 19.3 μm; Tap density: 2.01 g/cm³; BET surface: 20.1 m²/g; Half-width 101 reflex FWHM: 1.37° Θ; crystallite size 45 Å; Impurities: Na: 23 ppm; SO$_4$: 12750 ppm.

Figure 1:
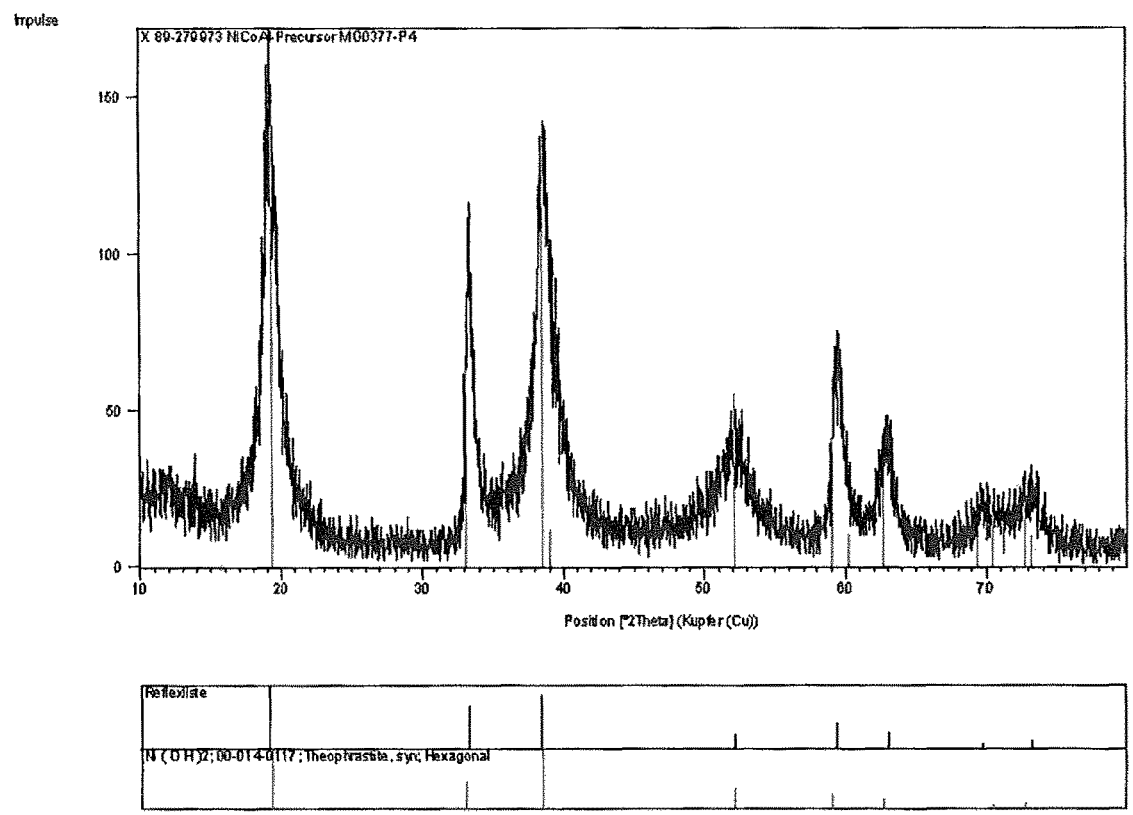
Figure 2:
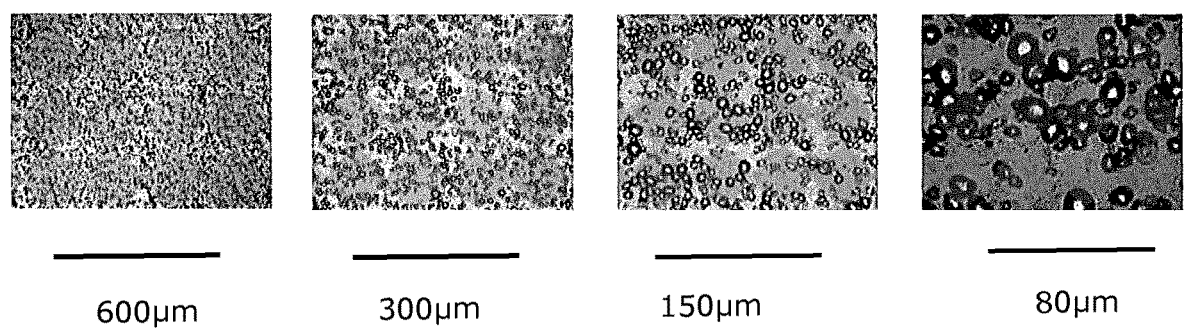
FIG. 2 shows the light-microscopic image of the hydroxide that is produced.
Figure 3:
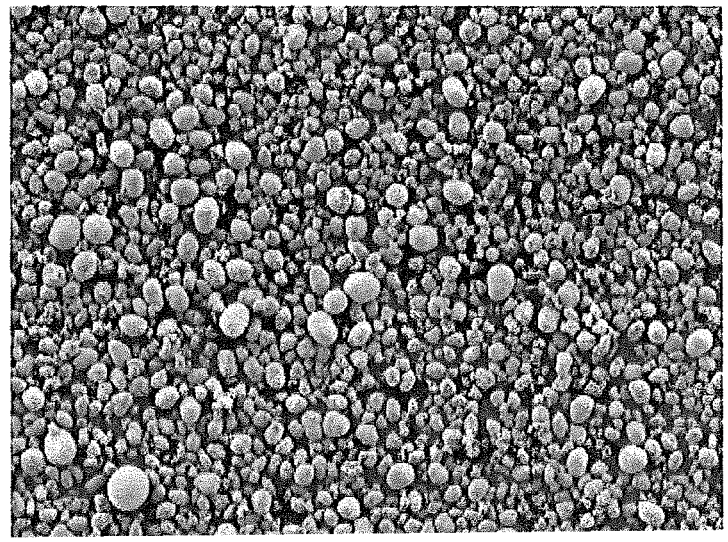
FIG. 3 shows a SEM image of the hydroxide that is produced.
Figure 4:
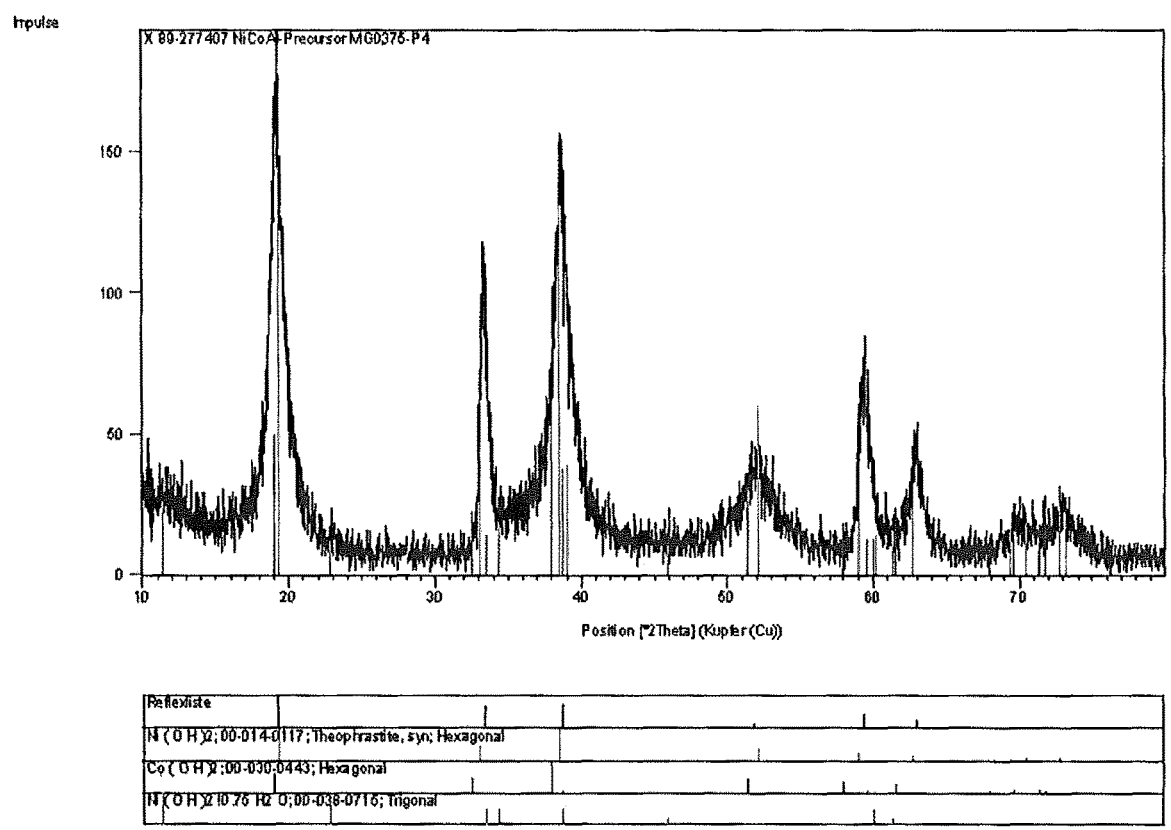

FIG. 4 shows an X-ray diffraction of the powder that is produced. Only the β-nickel (II) hydroxide phase is visible. Separate cobalt or aluminum phases do not occur.

Figure 5:
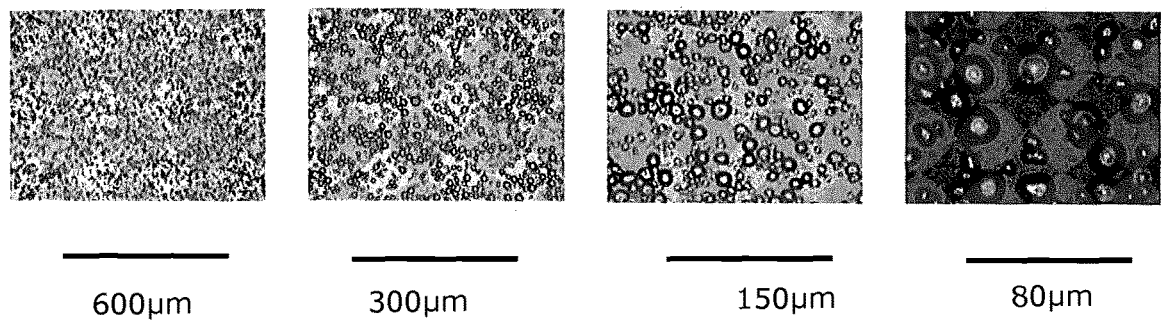

FIG. 5 shows the light-microscopic image of the hydroxide that is produced.

Figure 6:
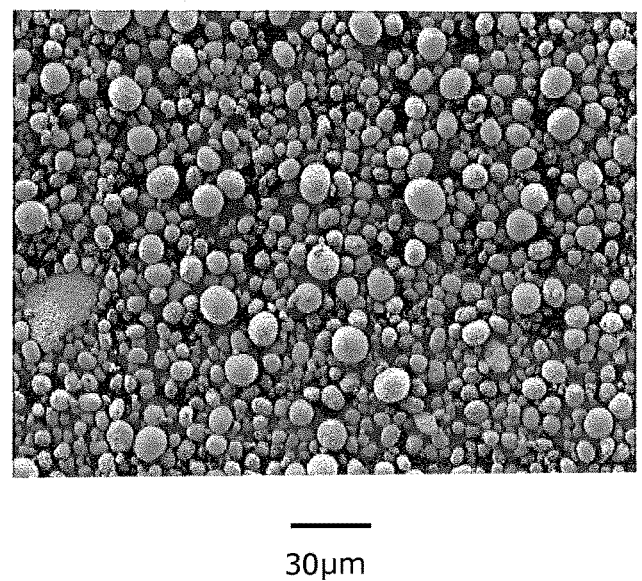

FIG. 6 shows an SEM image of the hydroxide that is produced.

Example 3 (Comparative Example)

The reactor is operated under the same stationary concentrations and the same conditions as Example 2. In contrast to Example 2, the aluminum is added in the form of Al$_2$(SO$_4$)$_3$ dissolved in the nickel/cobalt sulfate solution. After reaching the steady state, a sample is removed and processed as described under Example 2. The tap density of the recovered material is 1.19 g/cm³, which is substantially lower than that of the nickel (II) hydroxide produced following the method according to the invention.

Figure 7:
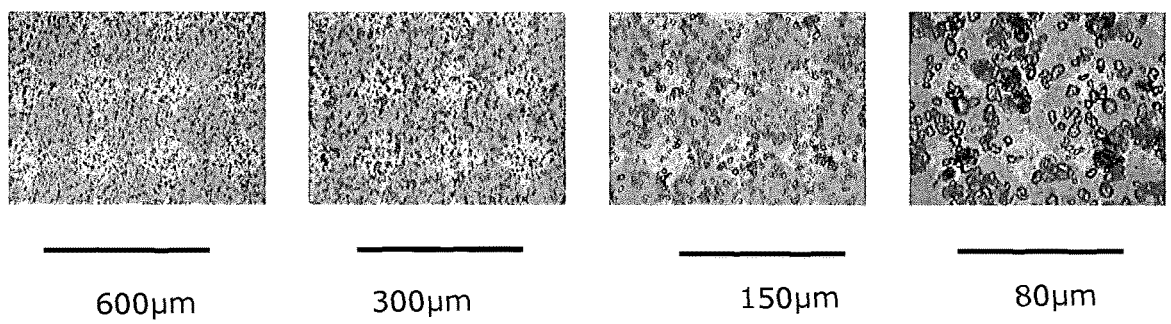

FIG. 7 shows a light-microscopic image of the material. As can be seen, the particles are sharp-edged and square and the material is obviously not appropriate for use in accumulators.

Example 4: (According to the Invention)

The solids content of a suspension from Example 1 is first increased from 92 g/L to 430 g/L by decanting the mother liquor. The NaOH concentration in the remaining mother liquor is then increased from 5 g/L to 13 g/L by adding solid NaOH. Afterwards, the suspension is kept at a temperature of 85° C. for 6 hours while stirring. After processing of the suspension by filtration and washing with subsequent drying, as described in Example 1, the product has a sulfate content of 7250 ppm. The sulfate content is thus decreased by 4150 ppm.

Example 5: (According to the Invention)

The solids content of a suspension from Example 1 is first increased from 92 g/L to 430 g/L by decanting the mother liquor. The NaOH concentration in the remaining mother liquor is then increased from 5 g/L to 30 g/L by adding solid NaOH. Afterwards, the suspension is kept at a temperature of 85° C. for 6 hours while stirring. After processing of the suspension by filtration and washing with subsequent drying as described in Example 1, the product has a sulfate content of 5250 ppm. The sulfate content is thus decreased by 6150 ppm.

Examples 6 to 9 (According to the Invention)

A suspension, such as that obtained from Examples 1 and 2, is filtered off and washed with water as described there. After determination of the residual moisture and sulfate content, the filter cake is again slurried using enough water to obtain a suspension having a solids content of 200 g/L. Na$_2$SO$_4$ and NaOH are then added until the concentrations entered in Table 1 are attained. The suspension thus produced is stirred for 6 hours at 85° C. and then processed by filtration, washing and drying. These additional steps have no influence on the obtained crystallite size of 45 Å. The sulfate content is then determined and compared to the content in the original precipitate that was 12012 ppm.

TABLE 1

|  | Example 6 | Example 7 | Example 8 | Example 9 |
| --- | --- | --- | --- | --- |
| Na$_2$SO$_4$ (g/L) | 2 | 2 | 120 | 120 |
| NaOH (g/L) | 30 | 50 | 30 | 50 |
| Final sulfate content (ppm) | 2821 | 2520 | 8548 | 7497 |
| Difference (ppm) | 9191 | 9492 | 3464 | 4515 |

The other characteristics of Examples 4 to 9, such as PSD, tap density, BET surface area, half-width 101 reflex FWHM and crystallite size are the same as Example 1 or 2.

Production of Lithium Nickel Cobalt Aluminum Oxide (LNCAO):

Example 10 (According to the Invention)

The β-nickel (II) hydroxide according to the invention is mixed with lithium hydroxide and heated to 180° C. within 30 minutes while adding 4000 L/h oxygen. The temperature is raised to 420° C. within 480 minutes and then to 730° C. within 120 minutes. The temperature is kept at 730° C. for 330 minutes. Next the oven is cooled down to room temperature within 360 minutes. The annealed LNCAO material, which is deagglomerated in a micronizer, has the following properties: Particle size distribution: D50: 6.5 μm; Tap density: 2.14 g/cm³, which means an addition of 0.18 g/cm³ compared to the β-nickel (II) hydroxide that was used; pH-value at 25° C.: 12.16; Warder titration: 0.734% LiOH, 1.638% Li$_2$CO$_3$, no Al leaching.

Example 11 (According to the Invention)

The β-nickel (II) hydroxide according to the invention is mixed with lithium hydroxide and heated to 180° C. within 30 minutes while adding 4000 L/h oxygen. The temperature is raised to 420° C. within 320 minutes and then to 730° C. within 120 minutes. The temperature is kept at 730° C. for 220 minutes. Next, the oven is cooled down to room temperature within 360 minutes. The annealed LNCAO material, which is deagglomerated in a micronizer, has the following properties: Particle size distribution: D50: 6.5 μm; Tap density: 2.20 g/cm³, which means an addition of 0.24 g/cm³ compared to the β-nickel (II) hydroxide that was used; pH-value at 25° C.: 12.15; Warder titration: 0.807% LiOH, 1.772% Li$_2$CO$_3$, no Al leaching.

As a comparison of Examples 10 and 11 shows, no aluminum is dissolved out of the LNCAO according to the invention during Warder titration. The temperature processing in Example 11 is shortened to 11.5 hours, as compared to Example 10 at 16 hours, which corresponds to a time savings of 28% without this having a negative influence on the product properties. Quite to the contrary, the tap density when using the shorter temperature treatment is actually increased. Based on the attained results, an additional time savings is to be expected without this negatively influencing the product properties. The annealing time could thus be further shortened, for example to 9 hours, preferably to 8 hours and particularly preferably to 6.4 hours, which corresponds to a time savings of 40%, 50% and even 60% compared to the standard annealing time of 16 hours.

The invention claimed is:

1. A β-nickel (II) hydroxide that is doped with both Al and Co ions, wherein the Al ions are distributed homogeneously in the crystal lattice of the β-nickel (II) hydroxide, wherein the β-nickel (II) hydroxide comprises secondary particles composed of spherically agglomerated primary crystallites having a primary crystallite size of 100 Å or less, determined via X-ray diffraction, and wherein the secondary particles have a particle size between 2 and 20 μm.

2. The β-nickel(II) hydroxide according to claim 1, wherein the primary crystallites have a primary crystallite size of less than 50 Å.

3. The β-nickel (II) hydroxide according to claim 1, wherein particles of the β-nickel (II) hydroxide have a form factor of greater than 0.8.

4. The β-nickel (II) hydroxide according to claim 1, wherein the primary crystallites have a form factor greater than 0.8.

5. The β-nickel (II) hydroxide according to claim 1, wherein the content of Al ions in the β-nickel (II) hydroxide is 1.5 to 10 mol %.

6. The β-nickel (II) hydroxide according to claim 1, having a tap density of at least 1.8 g/cm$^3$, determined in accordance with ASTM B 527.

7. A method for producing the β-nickel (II) hydroxide according to claim 1 comprising precipitating β-nickel (II) hydroxide doped with Al ions, wherein an aluminate is used as the Al ion source.

8. The method according to claim 7 comprising the following steps:
 a) preparing a solution formed from $Na_2SO_4$, NaOH and $NH_3$ in the presence of water;
 b) adding an aluminate and a nickel compound to the mixture from step a) thereby forming β-nickel (II) hydroxide doped with Al ions; and
 c) separating the obtained β-nickel (II) hydroxide.

9. The method according to claim 8, wherein the aluminate is added in the form of a basic solution.

10. The method according to claim 8 wherein in step b) the nickel compound is a nickel/cobalt sulfate solution whereby in step c) a β-nickel (II) hydroxide doped with Co and Al ions is obtained.

11. The method according to claim 8, further comprising an additional conditioning step with sodium hydroxide for reducing the sulfate content of the obtained β-nickel (II) hydroxide.

12. A method for producing lithium nickel cobalt aluminum oxide, comprising the following steps:
 a) preparing a β-nickel (II) hydroxide doped with Al and Co ions according to claim 10;
 b) mixing the β-nickel (II) hydroxide doped with Al and Co ions with lithium hydroxide; and
 c) processing the mixture from step b) in an oxygen-containing atmosphere at a temperature between 700 and 850° C. to obtain lithium nickel cobalt aluminum oxide.

* * * * *